(12) United States Patent
Besombe et al.

(10) Patent No.: US 9,900,441 B2
(45) Date of Patent: Feb. 20, 2018

(54) METHOD AND CORRESPONDING DEVICE FOR MANAGING THE SET-UP OF A COMMUNICATION BETWEEN A CALLING TERMINAL AND A GROUP OF TERMINALS SHARING ONE AND THE SAME PUBLIC IDENTITY

(71) Applicant: ORANGE, Paris (FR)

(72) Inventors: Philippe Besombe, Louannec (FR); Francois Toutain, Louannec (FR)

(73) Assignee: ORANGE, Paris (FR)

( * ) Notice: Subject to any disclaimer, the term of this patent is extended or adjusted under 35 U.S.C. 154(b) by 82 days.

(21) Appl. No.: 14/287,968

(22) Filed: May 27, 2014

(65) Prior Publication Data

US 2014/0355489 A1     Dec. 4, 2014

(30) Foreign Application Priority Data

May 31, 2013    (FR) ..................................... 13 55006

(51) Int. Cl.
*G06F 15/16*        (2006.01)
*H04W 4/00*         (2009.01)
(Continued)

(52) U.S. Cl.
CPC ........ *H04M 3/561* (2013.01); *H04L 65/1016* (2013.01); *H04L 65/1069* (2013.01);
(Continued)

(58) Field of Classification Search
CPC .............. H04M 3/561; H04M 3/42093; H04L 65/1016; H04L 67/24; H04L 61/3095;
(Continued)

(56) References Cited

U.S. PATENT DOCUMENTS

| 6,449,344 | B1 * | 9/2002 | Goldfinger | H04L 51/04 |
| | | | | 379/201.01 |
| 8,559,419 | B2 * | 10/2013 | Belinchon Vergara | |
| | | | | H04L 29/12188 |
| | | | | 370/352 |
| 2002/0075306 | A1 | 6/2002 | Thompson et al. | |
| 2006/0034430 | A1 | 2/2006 | Liakis | |
| 2006/0070003 | A1 * | 3/2006 | Thompson | G06F 3/0481 |
| | | | | 715/758 |
| 2006/0218291 | A1 * | 9/2006 | Zhu | H04L 65/1069 |
| | | | | 709/229 |
| 2009/0068996 | A1 * | 3/2009 | Bakker | H04L 65/1016 |
| | | | | 455/414.1 |
| 2010/0023624 | A1 * | 1/2010 | Long | H04L 65/1016 |
| | | | | 709/227 |
| 2011/0246656 | A1 * | 10/2011 | Horowitz | H04M 3/465 |
| | | | | 709/228 |

(Continued)

FOREIGN PATENT DOCUMENTS

| EP | 2166733 A1 * | 3/2010 |
| FR | 2850226 A1 | 7/2004 |
| WO | 2012089954 A2 | 7/2012 |

OTHER PUBLICATIONS

French Search Report and Written Opinion dated Jan. 29, 2014 for corresponding French Application No. 1355006, filed May 31, 2013.

(Continued)

*Primary Examiner* — Edan Orgad
*Assistant Examiner* — Vanneilian Lalchinthang
(74) *Attorney, Agent, or Firm* — David D. Brush; Westman, Champlin & Koehler, P.A.

(57) ABSTRACT

A method and a terminal are provided for commanding a set-up of a communication between the terminal and a group of terminals associated with one and the same shared public identity. The method includes a step of the terminal issuing, via a communication network, a communication request intended for the shared public identity; and a step of sending to a management server a request to obtain an item of information representing the number and the state of the terminals in the group of terminals associated with the shared public identity. Following reception of the item of information from the server, the terminal returns the item of information to a user of the terminal.

14 Claims, 5 Drawing Sheets

(51) Int. Cl.
  *G06F 13/00* (2006.01)
  *H04M 3/56* (2006.01)
  *H04L 29/06* (2006.01)
  *H04L 29/08* (2006.01)
  *H04M 3/42* (2006.01)
  *H04L 29/12* (2006.01)

(52) U.S. Cl.
  CPC .......... *H04L 65/1073* (2013.01); *H04L 67/24* (2013.01); *H04M 3/42093* (2013.01); *H04M 3/42102* (2013.01); *H04M 3/42263* (2013.01); *H04M 3/42374* (2013.01); *H04L 61/3095* (2013.01); *H04L 65/1006* (2013.01)

(58) Field of Classification Search
  CPC ............. H04L 65/1006; H04L 65/1069; H04L 65/1073; H04W 8/183; G06F 15/16
  USPC ........................................................ 370/261
  See application file for complete search history.

(56) References Cited

U.S. PATENT DOCUMENTS

2012/0258768 A1* 10/2012 Takahashi ......... H04W 36/0083
                                                        455/525

OTHER PUBLICATIONS

J Rosenberg, "A Data Model for Presence; frc4479.txt" 20060701, Jul. 31, 2006 (Jul. 31, 2006), XP015054986.
English Translation of the French Written Opinion for corresponding French Patent Application No. 1355006, filed May 31, 2013.

* cited by examiner

200
METHOD AND CORRESPONDING DEVICE FOR MANAGING THE SET-UP OF A COMMUNICATION BETWEEN A CALLING TERMINAL AND A GROUP OF TERMINALS SHARING ONE AND THE SAME PUBLIC IDENTITY

FIELD OF THE DISCLOSURE

The invention lies in the field of telecommunication networks. It relates to a device and a method for managing the set-up of a communication between a calling terminal and a group of terminals sharing one and the same public identity.

BACKGROUND OF THE DISCLOSURE

Today, a user can receive a communication over a plurality of terminals associated with one and the same shared public identity (IMPU for IP Multimedia Public Identity in English) or one and the same telephone number. When a call intended for the shared public identity is issued, the call request is transmitted to the plurality of terminals and a user of a terminal in the plurality of terminals can accept the call from his terminal.

The drawback of this technique is that the user issuing the communication does not know that the communication can be taken by any terminal in a plurality of terminals and therefore does not know that several users are liable to reply to him.

Moreover, the calling user does not know the state of the terminals in the plurality of terminals liable to receive the communication. The term "state of a terminal" specifically refers here to the state of presence of a terminal on the communication network, the fact that the terminal is or is not registered in the communication network, or whether the terminal is on a call, engaged, unreachable or unavailable.

Document WO2012089954 allows a first terminal registered in a communication network and associated with a shared public identity to obtain an item of information on the presence and the state of a second terminal registered in the communication network and associated with the same shared public identity as the first terminal. A user of the first terminal is thus informed as to whether a second terminal associated with the same shared public identity is registered in the communication network, whether it is in a nomadic situation, whether it is engaged, etc.

Thus, on reception of a communication request intended for the public identity shared by the first and the second terminal, the user of the first terminal can decide whether or not to use the first terminal to reply to the communication request according to the state of the second terminal.

This solution does not make it possible to inform the calling terminal of the state of the called terminals because only the terminals associated with the same shared public identity are notified of the state of the first and second called terminals.

Moreover, adapting this solution so that the calling terminal is informed of the state of the first and second called terminals would require excessive complexity. This is because it is impossible to predict in advance either the shared public identity to which the calling terminal will issue a communication or the moment of issue of such a communication. It would then be necessary to permanently save in the communication network the state of all the terminals registered in the communication network that are liable to be called in order to inform the calling terminal of the state of the terminals liable to be called when the calling terminal issues a communication to the shared public identity. This solution cannot be considered because it would require very large memory resources.

SUMMARY

An aspect of the present disclosure relates to a method for commanding the set-up of a communication between a terminal and a group of terminals associated with one and the same shared public identity. The method comprises a step of said terminal issuing, via a communication network, a communication request intended for the shared public identity. The method also comprises a step of sending to a management server a request to obtain an item of information representing the number and the state of the terminals in the group of terminals associated with the shared public identity, a step of receiving said item of information from the server, and a step of returning said item of information to a user of the terminal issuing said communication request.

Correlatively, the invention also relates to a terminal implementing the method for commanding the set-up of a communication. Such a terminal notably comprises means for sending to a management server a request to obtain an item of information representing the number and the state of the terminals in the group of terminals associated with the shared public identity, means for receiving said item of information, and means for returning said item of information to a user of said terminal.

A state of a terminal liable to be called can correspond to a state of presence of the terminal on the communication network via which the communication is set up, for example whether or not the terminal is registered in the communication network. The state of a terminal can also correspond to the reply from the terminal that receives the communication request, for example ringtone in progress or to warn the user of the terminal of the communication request, engaged terminal, refused communication or, unavailable terminal.

Owing to the method according to the invention, a user of the terminal issuing the communication request is informed that his communication request intended for the public identity is sent to several terminals and of the state of these terminals. This item of information is returned to the user by the terminal issuing the communication request, for example in a visual form using an interface displayed on the screen of the terminal issuing the communication request.

According to another example, the return may be audio return of the information by the broadcast of a voice message to the user of the terminal issuing the communication request indicating that his call is sent to several terminals.

The various embodiments or implementation features mentioned hereinafter can be added independently or in combination with each other, to the steps of the method for commanding the set-up of a communication defined above.

According to a particular embodiment of the invention, the step of sending a request to obtain an item of information representing the number and the state of the terminals in the group of terminals associated with the shared public identity is implemented prior to the step of issuing the communication request. Following the step of returning said item of information, the method for commanding the set-up of a communication furthermore comprises a step of user interaction on the terminal issuing the communication request in order to select, among the terminals in the group of terminals associated with the shared public identity, at least one destination terminal to which the communication request needs to be transmitted, and a step of sending to the management server a command to select the destination terminal.

Thus, a user of the terminal issuing the communication request can choose the terminals to which he wishes to issue the communication request in order to set up the communication with the terminal that would be most suitable for the type of communication being considered. For example, if a professional or private communication is involved, the user of the terminal issuing the communication request can choose a terminal whose user or location he knows. According to another example, to optimize the quality of the communication, the user of the terminal issuing the communication request can select a terminal possessing specific features, for example a mobile or a desktop terminal, or one making it possible to use specific communication functions, for example a terminal supporting video communication, or the RCS protocol, etc.

According to another particular embodiment of the invention, following the step of returning the information representing the number and the state of the terminals in the group of terminals associated with the shared public identity, the method for commanding the set-up of a communication comprises a step of user interaction on the terminal issuing the communication request in order to select, among the terminals in the group of terminals associated with the shared public identity, at least one terminal, and a step of sending, to the management server, a command to inhibit the sending of the communication request to the selected terminal.

Correlatively, the terminal implementing the method for commanding the set-up of a communication comprises user interaction means making it possible to select, among the terminals in the group of terminals associated with the shared public identity, at least one terminal, and means for sending a command to inhibit the sending of the communication request to the selected terminal.

When the communication request is sent in parallel with or prior to the reception, by the terminal issuing the communication request, of the number and the state of the destination terminals to which the communication request is sent, this particular embodiment of the invention allows the user of the terminal issuing the communication request to select a terminal to which he wishes to interrupt the sending of the communication request.

According to another particular embodiment of the invention, following the reception, from a first terminal in the group of terminals associated with the shared public identity, of a positive reply to the communication request, the method for commanding the set-up of a communication comprises a step of user interaction on the terminal issuing the communication request in order to select, among the terminals in the group of terminals associated with the IMPU, at least one second terminal, and a step of sending, to the management server, a command to continue the sending of the communication request to the second selected terminal.

Correlatively, the terminal implementing the method for commanding the set-up of a communication comprises user interaction means making it possible to select, among the terminals in the group of terminals associated with the IMPU, at least one terminal, and means for sending a command to continue the sending of the communication request to the selected terminal.

After setting up the communication between the terminal issuing the communication request and a first destination terminal, this particular embodiment of the invention allows the user of the terminal issuing the communication request to select another terminal to which he wishes to force the communication request. This particular embodiment of the invention makes it possible, by way of example, to set up a communication with more than two terminals. For example, the user of the terminal issuing the communication request can choose to add a destination terminal having access to capabilities enriching the communication, for example allowing the addition of video, the display of images or of interactive content during the communication. According to another example, the user of the terminal issuing the communication request can also choose to invite a user of a destination terminal.

The invention also relates to a method for managing the set-up of a communication between a terminal and a group of terminals associated with one and the same shared public identity, said terminal issuing, via a communication network, a communication request intended for the shared public identity. The method for managing the set-up of a communication comprises a step of receiving a request from the terminal issuing the communication request in order to obtain an item of information representing the number and the state of the terminals in the group of terminals associated with the shared public identity, a step of obtaining said item of information, and a step of sending to the terminal issuing the communication request said item of obtained item of information with the aim of returning it to the user of the terminal issuing the communication request The method for managing the set-up of a communication is implemented by a management server in the communication network. Such a server comprises means for receiving a request from the terminal issuing the communication request in order to obtain an item of information representing the number and the state of the terminals in the group of terminals associated with the shared public identity, means for obtaining said item of information, and means for sending to the terminal issuing the communication request said obtained item of information with the aim of returning it to the user of the terminal issuing the communication request The management method thus allows the user of the terminal issuing the communication request to be informed that his communication request intended for the shared public identity is sent to several terminals and of the state of these terminals at the moment the communication request is sent by the issuing terminal.

The various embodiments or implementation features mentioned hereinafter can be added independently or in combination with each other, to the steps of the method for managing the set-up of a communication defined above.

According to a particular embodiment of the invention, the step of sending to the terminal issuing the communication request the item of information representing the number and the state of the terminals in the group of terminals associated with the shared public identity is implemented only if the terminal issuing the communication request is a terminal that has been authorized by a user of a terminal associated with the shared public identity to obtain the state of a terminal in said group of terminals.

The users of the shared public identity can thus configure which users and which terminals can have access to the state of the terminals sharing the same public identity. For example, the access to the state of the terminals sharing the same public identity can be restricted to trusted individuals, or to the users or terminals for which an identifier is present in an address book associated with the shared public identity or in an address book associated with a terminal in the group of terminals associated with the shared public identity.

According to another particular embodiment of the invention, the method for managing the set-up of a communication comprises a step of reception of a command, from the terminal issuing the communication request, to inhibit or continue the sending of the communication request to a terminal selected among the terminals in the group of terminals associated with the shared public identity, and a step of sending to the communication network a message for management of the communication request, provoking the inhibition or the continuation of the sending of the communication request to the selected terminal.

The method for managing the set-up of a communication thus makes it possible to control the sending, in the communication network, of the communication request intended for a public identity shared by a group of terminals, according to commands received from the terminal issuing the communication request.

According to another particular embodiment of the invention, the method for managing the set-up of a communication comprises a step of sending to a destination terminal in the group of terminals an item of information indicating to the user of the destination terminal that the terminal issuing the communication request has issued a request in order to obtain an item of information representing the number and the state of the group of terminals associated with the shared public identity.

The user of the destination terminal is thus informed that the terminal issuing the communication request has requested an item of information on the state of presence of the terminals associated with the shared public identity and that the user of the issuing terminal is therefore liable to call the destination terminal.

According to another particular embodiment of the invention, the method for managing the set-up of a communication comprises a step of reception of an item of information updating a state relating to a destination terminal in the group of terminals associated with the shared public identity, and a step of sending to the terminal issuing the communication request a message comprising said item of updating information and making it possible to modify on the terminal issuing the communication request the return of the item of information representing the number and the state of the group of terminals associated with the shared public identity.

When the destination user is informed that the terminal issuing the communication request has requested an item of information on the state of presence of the terminals associated with the shared public identity, he can decide to modify his state of presence in order for example not to be disturbed by a call issued by the terminal issuing the communication request, or on the contrary in order to receive any communication that the terminal issuing the communication request might issue.

In a particular embodiment, the various steps of the method for commanding the set-up of a communication and the various steps of the method for managing the set-up of a communication are determined by computer program instructions.

Consequently, another subject of the invention is computer programs on an information storage medium, these programs being capable of being respectively implemented on a terminal or more generally on a computer, these programs respectively including instructions suitable for implementing the various steps of the methods that have just been described.

These programs can use any programming language, and be in the form of source code, object code or intermediate code between source code and object code, such as in a partly compiled form, or in any other desirable form.

Another subject of the invention is a computer-readable information storage medium, including instructions of a computer program as mentioned above.

The information storage medium can be any entity or device capable of storing the program. For example, the medium can include a storage means, such as a ROM, for example a CD ROM or a microelectronic circuit ROM, or else a magnetic recording means, such as a USB key or a hard disk.

On the other hand, the information storage medium can be a transmissible medium such as an electrical or optical signal, which can be delivered by an electrical or optical cable, by radio or by other means. The program according to the invention can in particular be downloaded on an Internet-type network.

Alternatively, the information storage medium can be an integrated circuit in which the program is incorporated, the circuit being suitable for executing or for use in the execution of the methods in question.

BRIEF DESCRIPTION OF THE DRAWINGS

Other advantages and features of the invention will appear more clearly upon reading the following description of several particular embodiments of the invention, given by way of simple, illustrative and non-limiting examples, and the appended drawings, among which.

DETAILED DESCRIPTION OF ILLUSTRATIVE EMBODIMENTS

Figure 1:
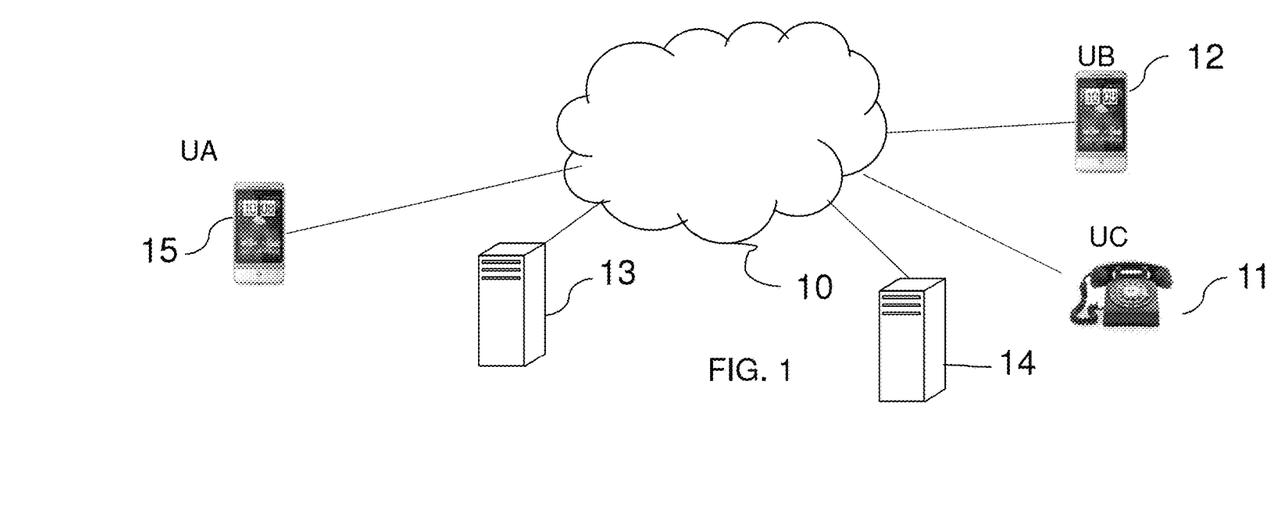
FIG. 1 illustrates an environment for implementing a particular embodiment of the invention.

FIG. 1 illustrates an environment for implementing a particular embodiment of the invention. The environment comprises a communication network 10 to which three terminals 11, 12 and 15, a management server 13 and an application server 14 are connected. The terminals 11, 12 and 15 can be any type of terminal making it possible to set up telephone or videophone communication, such as a mobile phone, a smartphone a tablet, a television connected to a telecommunication network or a personal computer on which a telephony application, also called softphone, is installed.

The communication network 10 can correspond for example to an IP (Internet Protocol in English) network or a mobile communication network of GSM, EDGE, 3G, 3G, + etc., type. The communication network 10 shown can correspond to a group of communication networks with different mutually interconnected operators making it possible to exchange data and to set up communications between terminals connected to the communication network 10 by way of access points (not shown) to the communication network.

The management server 13 and the application server 14 are servers belonging to an operator of the communication network 10. The user UB has taken out a subscription with an operator of the communication network 10. The application server 14 is a server making it possible to manage the signaling of the calls intended for the public identity of the user UB.

The terminals 12 and 11 are associated with the same public identity IMPU. For example, terminal 11 corresponds to the desktop terminal in the home of the user UB and terminal 12 corresponds to the mobile terminal of the user UB. Typically, terminal 11 can be used by any user UC situated at the home of the user UB in order to place or take call.

When a call is made, for example by terminal 15, that is intended for the public identity shared by terminals 11 and 12, the communication network 10 routes the call request to the two terminals 11 and 12. When one of terminals 11 or 12 accepts the call request, for example terminal 11, a communication is set up between terminal 11 and terminal 15, via the communication network 10.

When terminal 15 places a call request intended for the shared public identity, the user UA of terminal 15 knows neither that the call request will be routed by the communication network 10 to several terminals such as terminals 11 and 12 nor the state of presence of these destination terminals for the call request.

The term "state of presence of a terminal" here refers specifically to the information indicating whether the terminal is connected to the communication network, whether the terminal is free to receive a communication or already communicating, etc. For reasons of conciseness, the state of presence will be called "state" in the remainder of the description.

The invention is notably implemented by the management server 13, which supplies a communication set-up management service to the users subscribed to the service. Thus, in order to implement the invention, the user UB, having subscribed to the service of his operator in order to be able to associate several terminals with one and the same public identity, needs to have configured the service in order to authorize or not to authorize terminals or users to use the communication set-up management service for its public identity.

A calling user, for example the user UA, must for his part subscribe to the communication set-up management service with the operator of the user UB or install on his terminal 15 an application supplied by the operator of the user UB or by a third-party operator, the application making it possible to implement the method for commanding the set-up of a communication.

The method for commanding the set-up of a communication intended for a public identity shared by several terminals is implemented by terminal 15 during the communication set-up phase or prior to the communication request. The method for commanding the set-up of a communication is for example implemented by a dedicated application downloaded on terminal 15 and functioning in cooperation with the communication application of terminal 15.

According to another example, the method for commanding the set-up of a communication is incorporated into the communication application of terminal 15. The method for commanding the set-up of a communication allows the user UA of terminal 15 to obtain from the management server 13 an item of information indicating the number and the state of the destination terminals for the communication request.

For this purpose, the management server 13 implements the method for managing the set-up of a communication. On request from terminal 15, the management server 13 communicates with the communication network 10 to obtain an item of information indicating the number and the state of the terminals associated with the shared public identity. The management server 13 then communicates the terminal 15 in order to transmit this item of information to it. Where applicable, the management server 13 communicates with terminals 11 and 12 associated with the shared public identity in order to inform the user UB, or else the user UC and the user UB respectively, that terminal 15 has requested their state.

According to a particular embodiment of the invention, the communications of the server 13 with, on the one hand, terminals 15, 11 and 12 and, on the other hand, servers in the communication network 10 are for example implemented according to an HTTP (HyperText Transfer Protocol in English) protocol. Other communication protocols can be used for communications between the management server 13 and terminals 15, 11 and 12, for example an operator protocol.

In the embodiments described here, the communication network 10 is a network of IMS (IP Multimedia Subsystem in English) type and the SIP (Session Initiation Protocol) protocol is used to describe the call signaling messages exchanged between terminals 15, 11, 12 and the application server 14.

The invention is limited neither to the communication network of IMS type nor to the SIP protocol. The invention applies to other types of communication network and other communication protocols.

According to a particular embodiment of the invention, the management server 13 can be incorporated into the application server 14.

Figure 2:
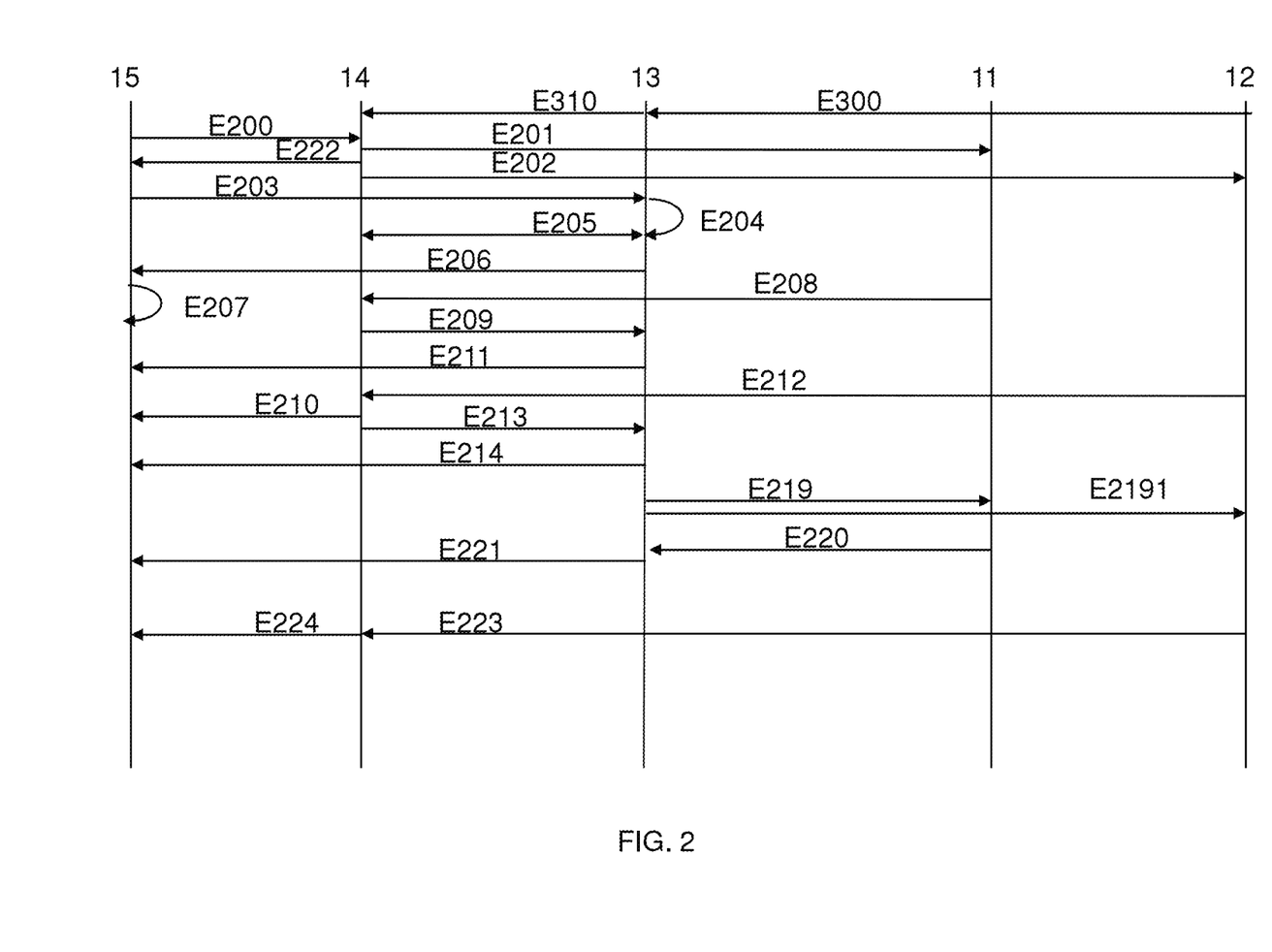
FIG. 2 presents a timing diagram illustrating steps of the method for commanding the set-up of a communication and steps of the method for managing the set-up of a communication set-up according to a particular embodiment of the invention.

FIG. 2 presents a timing diagram illustrating steps of the method for commanding the set-up of a communication and steps of the method for managing the set-up of a communication according to a particular embodiment of the invention.

In this particular embodiment of the invention, terminals 11 and 12 are associated with one and the same shared public identity assigned to the user UB by a telecommunications operator.

The public identity of the user UB corresponds for example to the phone number allowing the user UB to be reached on one of terminals 11 and 12.

The user UB previously configures, with the management server 13, the use of the service allowing several terminals to be associated with its public identity. For example, all the contacts in an address book associated with a user UB or with one of terminals 11 and 12 of the user UB can have access on request to items of information relating to the public identity assigned to the user UB. The items of information relating to the public identity correspond in this case to the number of terminals associated with the shared public identity and with the state of the terminals associated with the shared public identity.

In the configuration step E300, the user UB defines the terminals being able to access items of information relating to the public identity assigned to the user UB.

According to a particular embodiment of the invention, the management server uses a memory space to store identifiers for the authorized terminals determined by the user UB. Such identifiers can correspond to a telephone number of the terminal, to an IMEI (International Mobile Equipment Identity in English) number of a mobile terminal, a URI (Uniform Resource Identifier) address, an e-mail address, etc.

As a variant, a configuration for the authorized terminals is stored in a memory space in which an address book associated with the user UB is stored in the memory. The address book associated with the user UB is stored in a server for the communication network of the operator of the user UB.

For example, a parameter is placed in association with each contact in the address book of the user UB. The parameter indicates whether the contact is authorized to have access to items of information relating to the public identity assigned to the user UB.

In the same way, a parameter can be placed in association with each contact in an address book of another user UC associated with the same public identity as the user UB.

The user UB authorizes terminal 15 of the user UA to access items of information relating to the public identity associated with the user UB.

In the configuration step E310, the management server 13 informs the application server 14 that the user UB has configured access to items of information relating to his public identity.

When the user UA of terminal 15 wishes to set up a communication with an interlocutor such as the user UB, the user UA dials the telephone number of the interlocutor UB on his terminal 15, provoking the sending, in a step E200, of a communication request through the communication network 10, intended for the public identity corresponding to the phone number of the user UB. The communication request intended for the public identity associated with the user UB is received by the application server 14.

The communication request issued by terminal 15 corresponds to an INVITE message according to the SIP (Session Initiation Protocol in English) communication protocol.

Following the issue of the communication request, the application server 14 respectively transmits the communication request to terminals 11 and 12 in a known manner in steps E201 and E202 respectively, by sending INVITE messages to terminals 11 and 12.

As the user UB has configured the service allowing access to items of information relating to his public identity, in step E222, the application server 14 transmits to terminal 15, in reply to the communication request, a SIP message 100 Trying notably containing an item of information allowing terminal 15 to access the management server 13.

As a variant, the address for accessing the management server 13 has been stored in the memory of terminal 15 during the installation, by terminal 15, of the application making it possible to access the communication set-up management service.

In step E203, terminal 15 issues to the management server 13 a request in order to obtain an item of information representing the number and the state of the terminals associated with the shared public identity shared by terminals 11 and 12. The request issued by terminal 15 to the management server 13 notably contains the phone number of the user UB.

On reception, during step E203, of the request from terminal 15, the management server 13 verifies whether terminal 15 is a terminal authorized to have access to items of information relating to the public identity associated with the user UB, in a step E204.

To do this, the management server 13 examines the configuration data stored in step E300. For example, the management server 13 examines whether the telephone number of terminal 15 is an identifier determined by the user UB, or whether the telephone number of terminal 15 is present in the address book associated with the user UB, and whether the parameter associated with the telephone number of terminal 15 indicating whether the contact is authorized to have access to items of information relating to the public identity assigned to the user UB is correctly placed.

As the user UB has authorized terminal 15 to access information relating to the public identity assigned to the user UB, in a step E205, the management server 13 obtains from the application server 14 an item of information representing the number and the state of the terminals associated with the public identity assigned to the user UB. In a known manner, the application server 14 has knowledge of the state of the terminals, for example by interrogating the communication network core of the operator to which the user UB is subscribed.

The obtaining by the management server 13 of an item of information representing the number and the state of the terminals associated with the public identity assigned to the user UB is implemented by exchanges of messages with the application server 14 according to the HTTP protocol, for example.

The item of information representing the number and the state of the terminals associated with the public identity assigned to the user UB notably comprises: the number of terminals associated with the public identity, the list of the terminals associated with the public identity and an identifier associated with each terminal. As a variant, the item of information on the state of a terminal can also comprise the terminal type: desktop or mobile terminal, telephone, tablet or model of the terminal. The information on the state of a terminal can comprise items of information provided by the user UB in the configuration step E300, for example an identifier for a user or for a group of users, scheduling preferences for reaching the user, communication mode preferences, an alternative address for communicating, etc.

In step E206, the management server 13 sends to terminal 15 the item of information representing the number and the state of the terminals associated with the public identity assigned to the user UB.

Terminal 15 then returns the received item of information to the user UA of terminal 15 in step E207. Terminal 15 displays on its screen an interface comprising a list of the terminals associated with the public identity assigned to the user UB, as well as the state of these terminals. The state of the terminals can for example be: terminal registered in the communication network, unreachable terminal, etc. The state of a terminal can be indicated in the form of text displayed beside an identifier for the terminal or in the form of a sign describing a state of presence, for example a red circle for "unconnected", an orange circle for "engaged" or a green circle for "available".

As a variant, the management server 13 obtains in step E205 an item of information representing only the number of terminals associated with the public identity assigned to the user UB. The terminal 15 then returns to the user UB only the number of terminals associated with the public identity assigned to the user UB and not the state of these terminals.

In the particular embodiment described with reference to FIG. 2, the communication request issued by terminal 15 in step E200 is transmitted in parallel with or prior to the sending, to terminal 15, by the management server 13, of the item of information representing the number and the state of the terminals associated with the public identity assigned to the user UB.

Following the reception of the communication request by terminal 11 or 12, respectively, terminal 11 or 12, respectively, replies by sending to the application server 14 a SIP message 80 Ringing in step E208 or E212, respectively. The SIP message 180 Ringing indicates that the terminal issuing this message is producing a ringtone in order to inform the user UA of terminal 15 of a communication request.

Following the reception of a first reply message for the received communication request from a terminal associated with the public identity assigned to the user UB, in this case a SIP message 180 Ringing sent by terminal 11, the application server 14 extends the SIP message 180 Ringing to terminal 15 in a step E210.

In a step E209 or E213, respectively, the application server 14 informs the management server 13 of the state of terminal 11 or 12, respectively, based on the reply to the communication request received from terminal 11 or 12, respectively.

In a step E211 or E214, respectively, the management server 13 then sends to terminal 15 a message updating the state of terminal 11 or 12, respectively, so that terminal 15 updates the return of the state of the terminals on the screen of terminal 15.

For example, if the state of terminal 11 received in step E206 was "terminal registered in the communication network", terminal 15 updates the displayed interface by modifying the state of terminal 11 to "ringtone in progress on the terminal".

For example, if the state of terminal 12 received in step E206 was "terminal registered in the communication network", terminal 15 updates the displayed interface by modifying the state of terminal 12 to "ringtone in progress on the terminal".

In a variant of this particular embodiment of the invention, the message updating the state of terminal 11 or 12, respectively, sent by the management server 13 corresponds to the reply message (SIP message 180 Ringing) for the communication request sent by terminal 11 or 12, respectively, to the application server 14. In this variant, terminal 15 modifies the display of the interface of the communication application in order to update the state of terminals 11 and 12 based on the reply message received.

In a step E219 or E2191, respectively, the management server 13 sends to terminal 11 or 12, respectively, a message carrying an item of information indicating to the user UC of terminal 11 or to the user UB of terminal 12, respectively, that terminal 15 has issued a request to obtain an item of information representing the number and the state of the terminals associated with the public identity assigned to the user UB.

Following the reception of such a message, the user UC modifies the state of presence of his terminal 11, for example by deregistering his terminal 11 from the communication network 10 or by deactivating the reception of communications on his terminal 11. Terminal 11 then sends a message updating its state to the management server 13 in a step E220. This updating message is for example sent according to the HTTP protocol.

After receiving an update for the state of terminal 11, the management server 13 sends to terminal 15 a message updating the state of terminal 11 in a step E221 so that terminal 15 updates the return of the state of terminal 11 on the screen of terminal 15.

Terminal 15 updates the displayed interface by modifying the state of terminal 11 to "terminal unavailable".

The user UB picks up on his terminal 12 in order to take the communication requested by terminal 15. In a step E223, terminal 12 then sends a SIP message 200 OK to the application server 14. The application server 14 then extends this message to terminal 15 in a step E224. The communication is then set up in a known manner between terminals 15 and 12.

Figure 3:
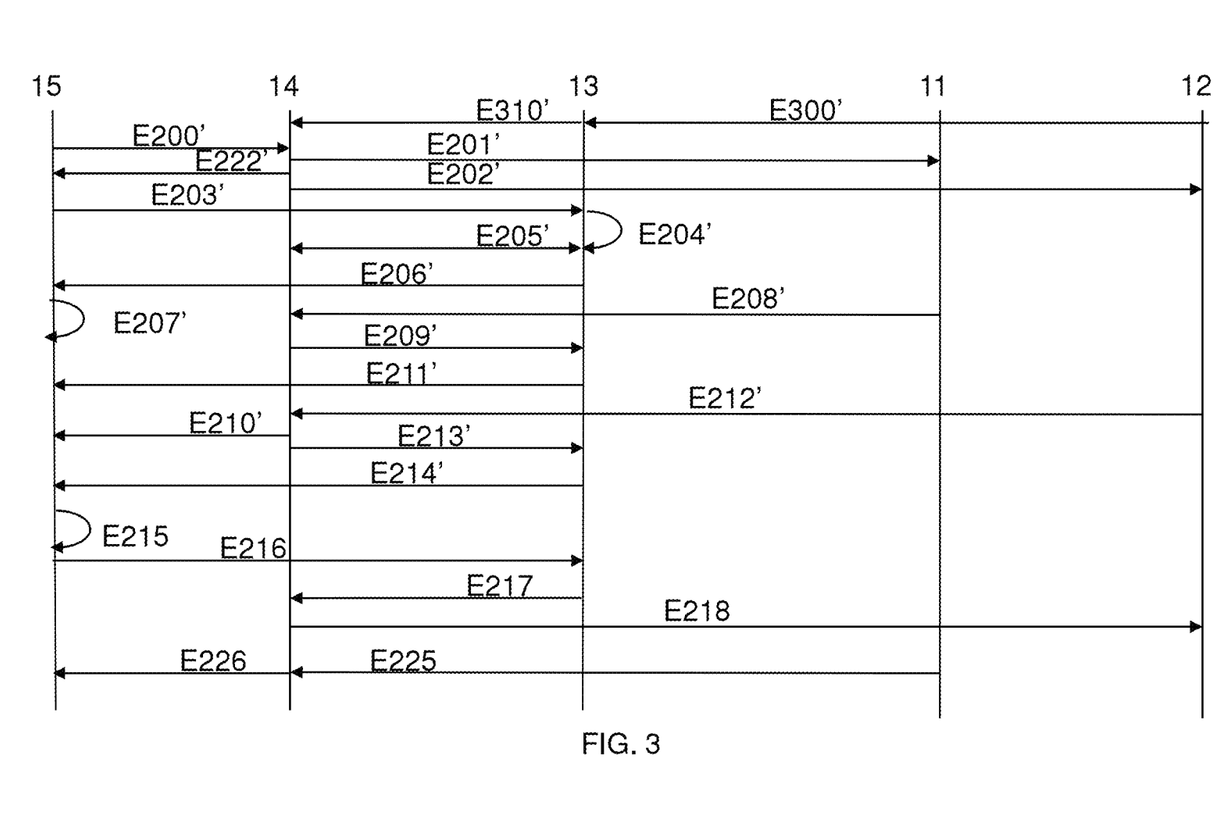
FIG. 3 presents a timing diagram illustrating steps of the method for commanding the set-up of a communication and steps of the method for managing the set-up of a communication according to another particular embodiment of the invention.

FIG. 3 presents a timing diagram illustrating steps of the method for commanding the set-up of a communication and steps of the method for managing the set-up of a communication according to another particular embodiment of the invention.

Steps E200' to E214', E222', E300' and E310' are identical to the corresponding steps described with reference to FIG. 2.

In this particular embodiment of the invention, when the user UA receives the item of information indicating the state of terminals 11 and 12, the user UA wishes to stop the sending of the communication set-up request requested in step E200' to terminal 12.

To do this, in a step E215, terminal 15 receives a user interaction command from the user UA in order to select a target terminal among terminals 11 and 12 associated with the public identity assigned to the user UB. The target terminal selected here is terminal 12. The user UA also chooses, for example from a menu displayed on terminal 15, a command for managing the set-up of the communication. The user UA chooses an inhibit command in order to stop the sending of the communication set-up request to terminal 12.

The inhibit command is sent by terminal 15 to the management server 13 in a step E216. During this step E216, the management server 13 receives the inhibit command. The management server 13 sends the command to the application server 14 in a step E217.

In step E218, the application server 14 then sends a SIP message CANCEL to terminal 12 in order to stop the communication set-up request and to stop the ringtone triggered on terminal 12.

The user UC picks up on his terminal 11 in order to take the communication requested by terminal 15. In a step E225, terminal 11 then sends a SIP message 200 OK to the application server 14. The application server 14 then extends this message to terminal 15 in a step E226. The communication is then set up in a known manner between terminals 15 and 11.

Figure 4:
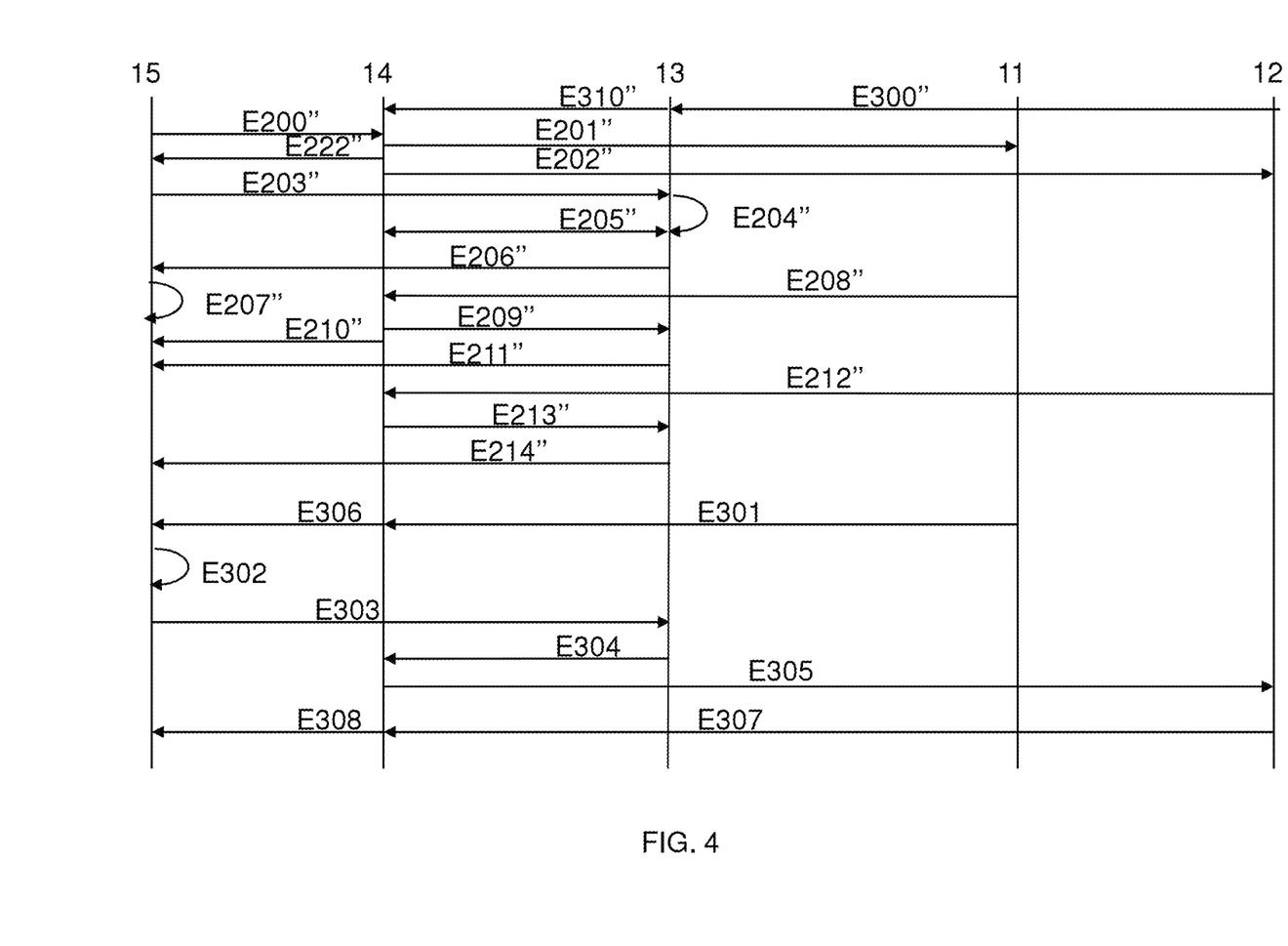
FIG. 4 presents a timing diagram illustrating steps of the method for commanding the set-up of a communication and steps of the method for managing the set-up of a communication according to another particular embodiment of the invention.

FIG. 4 presents a timing diagram illustrating steps of the method for commanding the set-up of a communication and steps of the method for managing the set-up of a communication according to another particular embodiment of the invention.

Steps E200" to E214", E222", E300" and E310" are identical to the corresponding steps described with reference to FIG. 2.

In this particular embodiment of the invention, when the user UC takes the communication with his terminal 11, the user UA wishes to force set-up of the communication with terminal 12 too. This particular embodiment allows for example, if terminal 11 of the user UC authorizes only communications in audio mode, terminal 12 to be added to the communication in progress between terminals 15 and 11 in order to use other media during the communication, such as the display of images, video, the use of a drawing tool, etc.

According to another example, this particular embodiment makes it possible to invite another interlocutor, in this case the user UB of terminal 12, to join the communication in progress between terminals 15 and 11.

In step E301, the user UC picks up on his terminal 11 in order to take the communication requested in step E200" by terminal 15. Terminal 11 then sends a SIP message 200 OK to the application server 14. The application server 14 then extends this message to terminal 15 in a step E306. The communication is then set up in a known manner between terminals 15 and 11.

In a step E302, terminal 15 receives a user interaction command from the user UA in order to select a target terminal among terminals 11 and 12 associated with the public identity assigned to the user UB. The target terminal selected is in this case terminal 12. The user UA also chooses, for example from a menu displayed on terminal 15, a command for managing the set-up of the communication. The user UA chooses a continue command in order to continue the sending of the communication set-up request to terminal 12.

The continue command is sent by terminal 15 to the management server 13 in a step E303. During this step, the management server 13 receives the continue command. The management server 13 sends the command to the application server 14 in a step E304.

In step E305, the application server 14 then sends a SIP message INVITE to terminal 12 in order to continue the communication set-up request and force terminal 12 to produce the ringtone indicating to the user UB that a communication request has been received.

In step E307, when the user UB picks up on his terminal 12 in order to take the communication requested in step E305 by terminal 15, terminal 12 sends a SIP message 200 OK to the application server 14. The application server 14 then extends this message to terminal 15 in a step E308. The communication is then set up in a known manner between terminals 15, 11 and 12 using a conference bridge, for example.

As a variant (not shown in FIG. 4), the user UB can refuse to take the communication requested in step E305. In that case, terminal 12 sends a SIP message 486 BUSY or a SIP message 480 Temporarily Unavailable to the application server 14, which extends the message to terminal 15. The display of terminal 15 is then modified to inform the user UA of the refusal of the user UB.

For example, terminal 15 updates the displayed interface by modifying the state of terminal 12 to "call refused".

Figure 5:
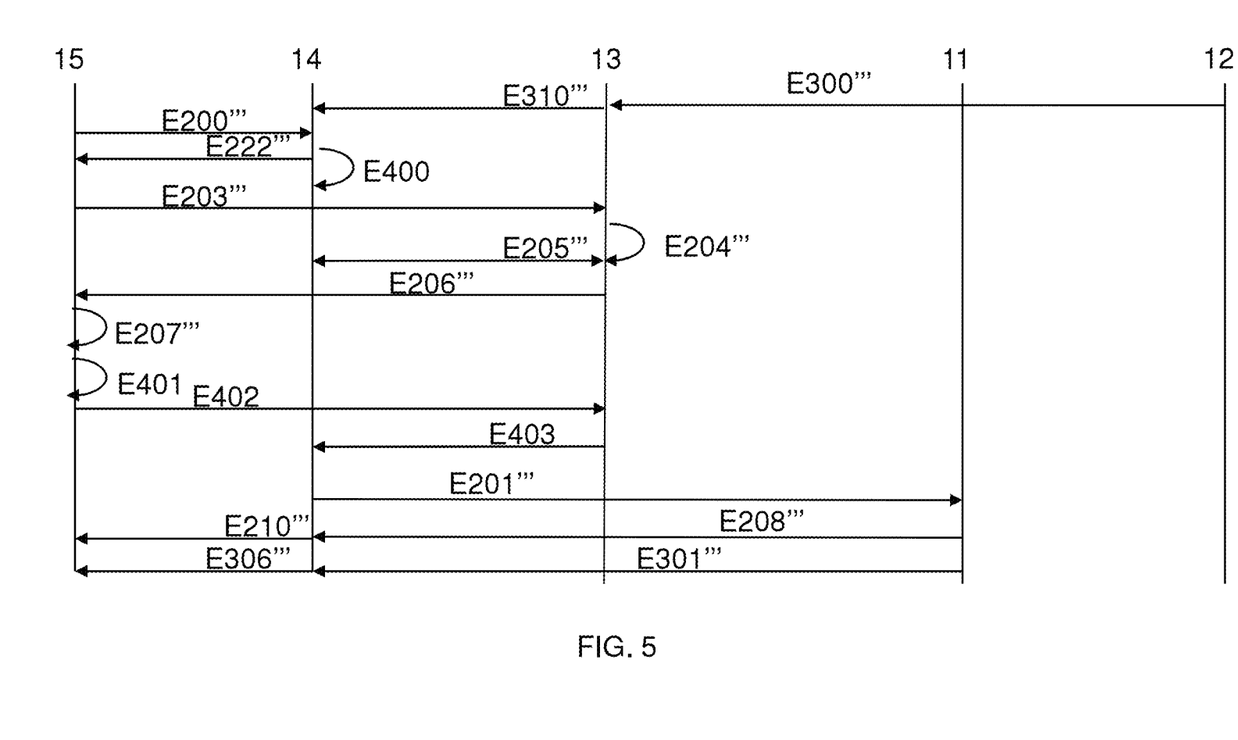
FIG. 5 presents a timing diagram illustrating steps of the method for commanding the set-up of a communication and steps of the method for managing the set-up of a communication according to another particular embodiment of the invention.

FIG. 5 presents a timing diagram illustrating steps of the method for commanding the set-up of a communication and steps of the method for managing the set-up of a communication according to another particular embodiment of the invention.

In this particular embodiment of the invention, the method for commanding the set-up of a communication is implemented prior to the sending of the communication request to terminals 11 and 12 of the public identity associated with the user UB.

Steps E300''' and E310''' are identical to the corresponding steps described with reference to FIG. 2.

When the user UA of terminal 15 wishes to set up a communication with an interlocutor UB, the user UA dials the telephone number of the interlocutor UB on his terminal 15, provoking the sending of a communication request, in the form of a SIP message INVITE, to the application server 14 in a step E200'''. In this particular embodiment of the invention, the user UA has subscribed to the communication set-up management service, with the operator of the user UB or with a third-party provider of the service. The subscription information of the user UA is saved in a memory on a server of the communication network.

The application server 14 detects in a step E400 that the user UA has subscribed to the communication set-up management service. For example, the application server 14 accesses the subscription data of the user UA that are saved in the communication network. According to another example, an item of information indicating that the user UA has subscribed to the communication set-up management service is transmitted in a field of the message sent in step E200'''. In step E400, the application server 14 then puts the sending of the communication request messages to terminals 11 and 12 on hold.

In a step E222'', the application server 14 transmits to terminal 15, in reply to the communication request, a SIP message 100 Trying notably containing an item of information allowing terminal 15 to access the management server 13.

In step E203''', terminal 15 issues to the management server 13 a request in order to obtain an item of information representing the number and the state of the terminals associated with the public identity shared by terminals 11 and 12. The request issued by terminal 15 to the management server 13 notably contains the phone number of the user UB.

On reception of the request from terminal 15, the management server 13 verifies whether terminal 15 is a terminal authorized to have access to items of information relating to the public identity associated with the user UB, in a step E204''' that is identical to step E204 described with reference to FIG. 2. In a step E205''' identical to step E205 described with reference to FIG. 2, the management server 13 obtains from the application server 14 an item of information representing the number and the state of the terminals associated with the public identity assigned to the user UB.

In step E206''', which is identical to step E206 described with reference to FIG. 2, the management server 13 sends to terminal 15 the item of information representing the number and the state of the terminals associated with the public identity assigned to the user UB.

Terminal 15 then returns the received item of information to the user UA of terminal 15 in step E207''', in which is identical to step E207 described with reference to FIG. 2. Terminal 15 displays, for example on its screen, an interface comprising a list of terminals 11 and 12 associated with the public identity assigned to the user UB, as well as the state of these terminals.

The user UA can then choose one or more terminals to which he wishes to send the communication request.

In a step E401, terminal 15 receives a user interaction command from the user UA in order to select a target terminal among the terminals associated with the public identity assigned to the user UB. The target terminal selected is in this case terminal 11.

The command to select terminal 11 is sent by terminal 15 to the management server 13 in a step E402. The management server 13 sends the selection command to the application server 14 in a step E403.

The application server 14 sends to terminal 11 a communication request message in the form of a SIP message INVITE in a step E201'''.

Following the reception, by terminal 11, of the communication request, terminal 11 replies by sending to the application server 14 a SIP message 180 Ringing in step E208'''. The SIP message 180 Ringing is extended to terminal 15 by the application server 14 in step E210'''.

In step E301''', the user UC picks up on is terminal 11 in order to take the communication requested in step E201''' by terminal 15. Terminal 11 then sends a SIP message 200 OK to the application server 14. The application server 14 then extends this message to terminal 15 in a step E306'''. The communication is then set up in a known manner between terminals 15 and 11.

Figure 6:
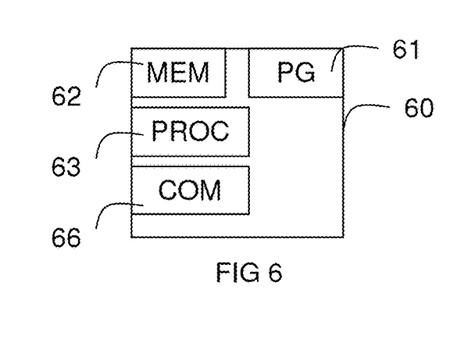
FIG. 6 illustrates a device making it possible to implement the method for managing the set-up of a communication according to a particular embodiment of the invention.

FIG. 6 illustrates a device 60 making it possible to implement the method for managing the set-up of a communication according to a particular embodiment of the invention.

The device comprises a storage space 62, for example a memory (MEM), a processing unit 63, equipped for example with a microprocessor (PROC), and driven by the computer program (PG) 61, implementing the method for managing the set-up of a communication as described in the invention with reference to any one of FIGS. 2 to 5.

At start-up, the code instructions of the computer program 61 are for example loaded into memory before being executed by the processor of the processing unit 63. The microprocessor of the processing unit 63 implements the steps of the method for managing the set-up of a communication between an issuing terminal and a group of terminals associated with one and the same shared public identity. The microprocessor of the processing unit 63 notably implements the steps of reception of a request from the terminal issuing the communication request in order to obtain an item of information representing the number and the state of the terminals in the group of terminals associated with the shared public identity, of obtaining said item of information, and of sending to the terminal issuing the communication request said obtained item of information with the aim of returning it to the user of the terminal issuing the communication request, according to the instructions of the computer program 61.

The device also includes a communication module 66 (COM), for example a network access unit, for example allowing the device 60 to communicate with the communication network 10 in FIG. 1 and the various appliances that are linked to the communication network. The communication means 66 notably allow the device 60 to exchange messages with the server 14 and the terminals 15, 11 and 12 in FIG. 1.

According to a particular embodiment of the invention, the storage space 62 makes it possible to store configuration data from the communication set-up management service to which a user UB of a terminal in the group of terminals associated with the shared public identity has subscribed.

Figure 7:
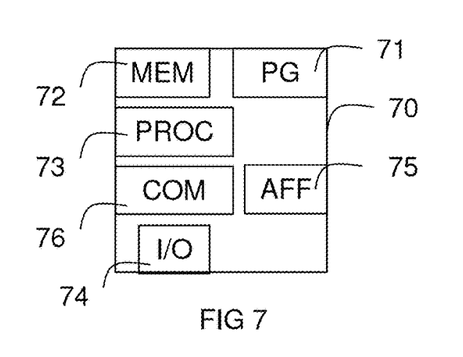
FIG. 7 illustrates a device making it possible to implement the method for commanding the set-up of a communication according to a particular embodiment of the invention.

According to a particular embodiment of the invention, the device 60 is included in a server, such as the server 13 in FIG. 1. FIG. 7 illustrates a device 70 making it possible to implement the method for commanding the set-up of a communication according to a particular embodiment of the invention.

The device comprises a storage space 72, for example a memory (MEM), a processing unit 73, equipped for example with a microprocessor (PROC), and driven by the computer program (PG) 71, implementing the method for commanding the set-up of a communication as described in the invention with reference to any one of FIGS. 2 to 5.

At start-up, the code instructions of the computer program 71 are for example loaded into memory before being executed by the processor of the processing unit 73. The microprocessor of the processing unit 73 implements the steps of the method for commanding the set-up of a communication between the device 70 and a group of terminals associated with one and the same shared public identity, and notably a step of emitting a communication request intended for the shared public identity, a step of sending to a management server a request in order to obtain an item of information representing the number and the state of the terminals in the group of terminals associated with the shared public identity, a step of receiving said item of information from the server, and a step of returning said item of information to a user of the device 70, according to the instructions of the computer program 71.

The device also comprises means for user interaction 74 (I/O) allowing the user to interact with the device 70, for example in order to select elements (commands, terminals) displayed on the screen of the device 70. This user interface may for example be a keyboard, a mouse or a touch-sensitive screen.

The device 70 comprises means 75 for returning information representing the number and the state of the terminals in the group of terminals associated with the shared public identity.

According to a particular embodiment of the invention, the return means correspond to a display means (AFF), such as a screen.

The device also includes communication means 76 (COM), for example a network access unit, for instance allowing the device 70 to set up communications via the communication network 10 in FIG. 1, to receive messages including an item of information representing the number and the state of the terminals in the group of terminals associated with the shared public identity, or an item of information updating the state of the terminals in said group.

According to a particular embodiment of the invention, the device 70 is able to interpret the received messages from a management server for the communication network, for example the server 13 described with reference to FIG. 1, in order to return to the user of the device an item of information on the state of the terminals to which the device 70 has issued a communication request.

According to another particular embodiment of the invention, the device 70 is able to interpret the received signaling messages (received in reply to a communication request) from the terminals, via the communication network, in order to return to the user of the device an item of information on the state of the terminals to which the device 70 has issued a communication request.

The device 70 is included in a terminal, such as for example terminal 15 in FIG. 1. More generally, the device 70 is included in a terminal such as for example a personal computer, desktop or mobile, a landline telephone terminal, a mobile telephone, a tablet, a connected television, a smartphone (term in English), etc.

Although the present disclosure has been described with reference to one or more examples, workers skilled in the art will recognize that changes may be made in form and detail without departing from the scope of the disclosure and/or the appended claims.

The invention claimed is:

1. A method comprising:
commanding a set-up of a communication between an issuing terminal and a group of terminals, the group of terminals being associated with one and the same shared public identity allowing for a first particular user to receive calls on the terminals of the group of terminals, wherein commanding comprises:
following a step of the issuing terminal sending a communication request to set up a call intended for the shared public identity, with the communication request being transmitted to the terminals in the group of terminals of which the first particular user can receive calls by an application server managing the signaling of calls intended for the shared public identity, performing the following acts by the issuing terminal:
sending to a management server a request to obtain an item of information representing the number and the state of the terminals to which the communication request has been transmitted,
receiving said item of information from the management server, and
returning said item of information to a second user of the terminal issuing said communication request and receiving a user interaction command from the second user that selects at least a target terminal among the terminals in the group of terminals associated with the shared public identity.

2. The method according to claim 1, wherein, in reply to the communication request issued by the issuing terminal, the method comprises, prior to sending to the management server the request to obtain the item of information representing the number and the state of the terminals to which the communication request has been transmitted, receiving, from the application server, a message containing an item of information allowing the issuing terminal to access the management server.

3. The method according to claim 1, wherein, following the step of returning said item of information, the method furthermore comprises:
sending to the management server a command to select at least one destination terminal, corresponding to the selected at least one target terminal, to which the communication request needs to be transmitted.

4. The method according to claim 1, wherein the method furthermore comprises, following returning said item of information:
sending to the management server a command to inhibit the sending of the communication request to the selected target terminal.

5. The method according to claim 1, wherein, following reception, from a first terminal in the group of terminals associated with the shared public identity, of a positive reply to the communication request, the method furthermore comprises:
user interaction on the terminal issuing the communication request making it possible to select among the terminals in the group of terminals associated with the shared public identity at least one second terminal, and
sending to the management server a command to continue the sending of the communication request to the second selected terminal.

6. A method comprising:
managing a set-up of a communication between an issuing terminal and a group of terminals, the group of terminals being associated with one and the same shared public identity allowing for a first particular user to receive calls on the terminals from the group of terminals, wherein managing comprises:
following a step of the issuing terminal sending a communication request to set up a call intended for the shared public identity, with the communication request being transmitted to terminals in the group of terminals of which the first particular user can receive calls by an application server managing the signaling of the calls intended for the shared public identity, performing the following acts by a management server:
receiving from the terminal issuing the communication request a request to obtain an item of information representing the number and the state of the destination terminals for the communication request,
obtaining said item of information from the application server, and
sending to the terminal issuing the communication request said obtained item of information with the aim of returning it to a second user of the terminal issuing the communication request so that the second user can select at least a target terminal among the terminals in the group of terminals associated with the shared public identity via a user interaction command.

7. The method according to claim 6, wherein the method comprises the application server sending, to the issuing terminal, a message containing an item of information allowing the issuing terminal to access the management server.

8. The method according to claim 6, wherein sending to the terminal issuing the communication request the information representing the number and the state of the terminals in the group of terminals associated with the shared public identity is only implemented if the terminal issuing the communication request is a terminal that has been authorized by the first user of a terminal associated with the shared public identity to obtain the state of a terminal in said group of terminals.

9. The method according to claim 6, wherein the method furthermore comprises:
receiving a command, from the terminal issuing the communication request, to inhibit or to continue the sending of the communication request to the target terminal selected among the terminals in the group of terminals associated with the shared public identity, and
sending to the communication network a message for management of the communication request, provoking the inhibition or the continuation of the sending of the communication request to the selected terminal.

10. The method according to claim 6, wherein the method furthermore comprises sending to a destination terminal in the group of terminals an item of information indicating to the first user of the destination terminal that the terminal issuing the communication request has issued a request to obtain an item of information representing the number and the state of the group of terminals associated with the shared public identity.

11. The method according to claim 10, wherein the method comprises:
   receiving an item of information updating a state relating to a destination terminal in the group of terminals associated with the shared public identity, and
   sending to the terminal issuing the communication request a message comprising said item of updating information and making it possible to modify on the terminal issuing the communication request the return of the item of information representing the number and the state of the group of terminals associated with the shared public identity.

12. A command terminal for commanding a set-up of a communication between said terminal and a group of terminals, the group of terminals being associated with one and the same shared public identity allowing a first particular user to receive calls on the terminals of the group of terminals, the terminal comprising:
   means for sending to a management server a request to obtain an item of information representing the number and the state of the terminals in the group of terminals by which the first particular user can receive calls and to which a communication request issued by said command terminal to set up a call, intended for the shared public identity, has been transmitted via an application server managing signaling of the calls intended for the shared public identity,
   means for receiving said item of information, and
   means for returning said item of information to a second user of said command terminal and receiving a user interaction command from the second user that selects at least a target terminal among the terminals in the group of terminals associated with the shared public identity.

13. The terminal according to claim 12, wherein the command terminal comprises:
   user interaction means making it possible to select, among the terminals in the group of terminals associated with the shared public identity, the target terminal, and
   means for sending a command to inhibit or to continue the sending of the communication request to the selected target terminal.

14. A system for managing a set-up of a communication between an issuing terminal and a group of terminals, the group of terminals being associated with one and the same shared public identity allowing a first particular user to receive calls on the terminals of the group of terminals, the system comprising:
   means for receiving a communication request issued by the issuing terminal to set up a call, intended for the shared public identity,
   means for receiving from the terminal issuing the communication request a request to obtain an item of information representing the number and the state of the terminals of the group of terminals to which the communication request has been transmitted and by which the first particular user can receive calls directed to the shared public identity,
   means for obtaining said item of information from an application server managing the signaling of the calls intended for the shared public identity, and
   means for sending to the terminal issuing the communication request said obtained item of information with the aim of returning it to a second user of the terminal issuing the communication request so that the second user can select at least a target terminal among the terminals in the group of terminals associated with the shared public identity via a user interaction command.

* * * * *